Figure 1:
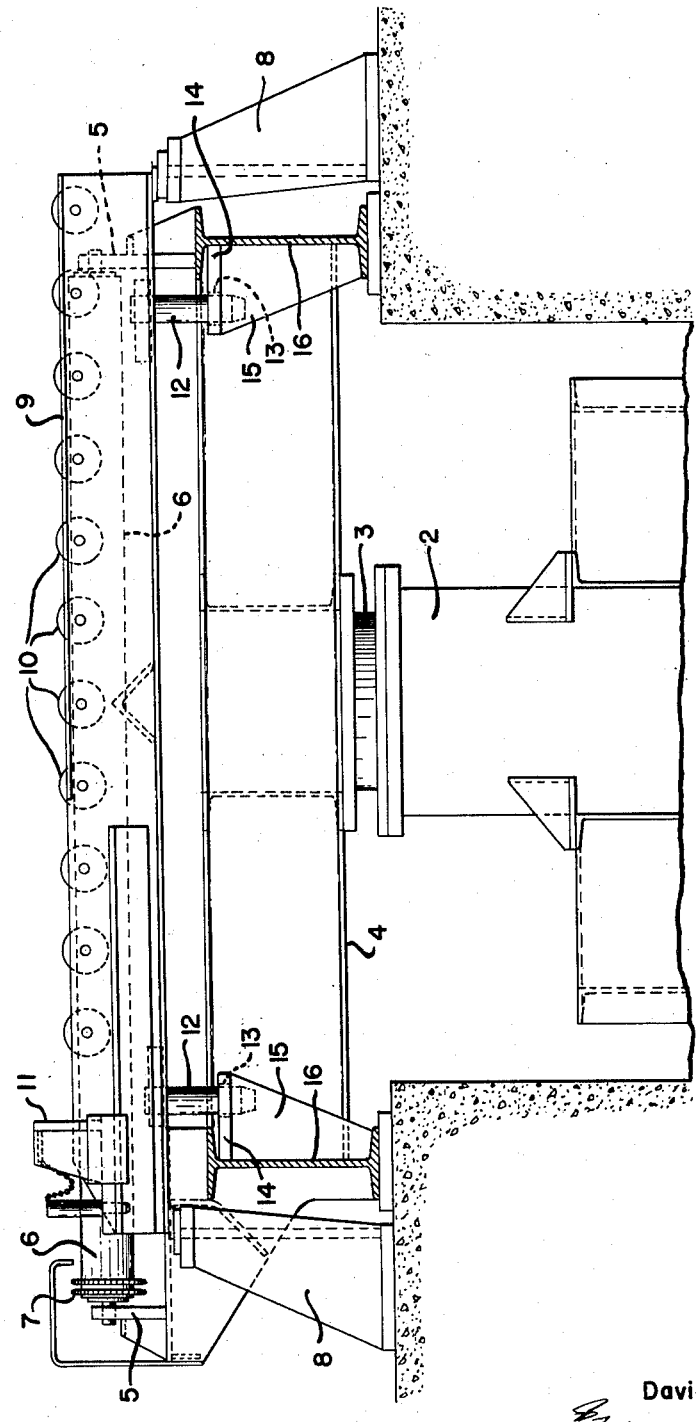

Aug. 19, 1958    D. E. DOLLE    2,848,095
CONVEYING MECHANISM
Filed Aug. 11, 1955    2 Sheets-Sheet 1

INVENTOR
David E. Dolle

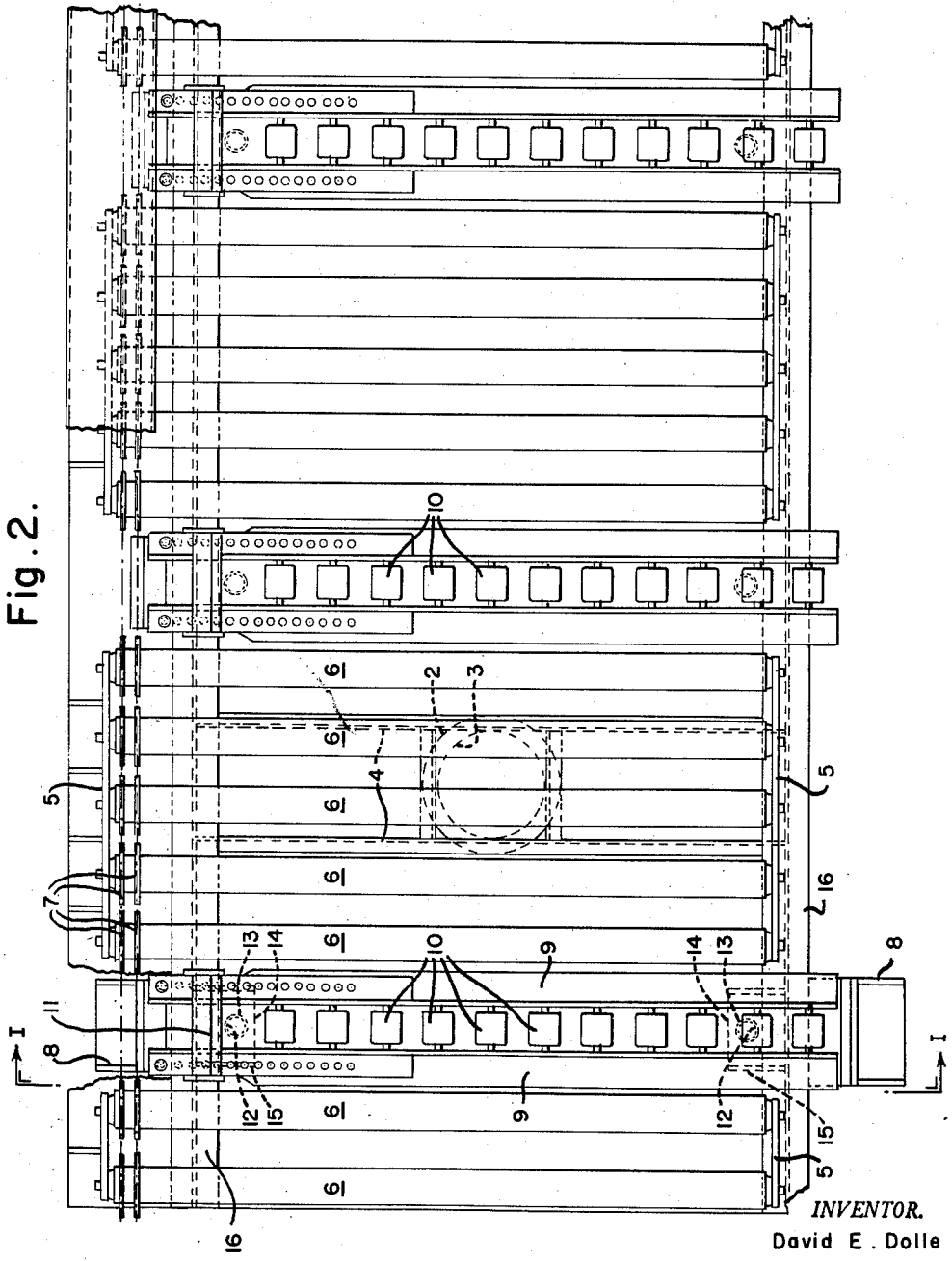

United States Patent Office 2,848,095
Patented Aug. 19, 1958

2,848,095

CONVEYING MECHANISM

David E. Dolle, Euclid, Ohio, assignor to Wean Equipment Corporation, Cleveland, Ohio, a corporation of Ohio Application August 11, 1955, Serial No. 527,847

6 Claims. (Cl. 198—20)

This invention relates to conveying mechanism and particularly to conveying mechanism comprising two conveyors adapted to support material being advanced and to transfer the material from one of the conveyors to the other. At least a portion of one of the conveyors is mounted for guided movement between an elevation at which its material supporting surface is below the level of the material supporting surface of the adjacent portion of the other conveyor and an elevation at which its material supporting surface is above the level of the material supporting surface of said portion of the other conveyor to effect transfer of the material from one of the conveyors to the other. Conveying mechanism of the type above referred to is old.

My conveying mechanism constitutes an improvement in that I make provision for substantial generally vertical movement of the first mentioned conveyor portion and substantially raising of the material above the position in which it is supported by the second mentioned conveyor portion without having to provide undersirably vertically elongated members of the first mentioned conveyor portion to project upwardly through or past the second mentioned conveyor portion to support the material as has heretofore been necessary.

I accomplish my improved result by mounting the second mentioned conveyor portion independently of the first mentioned conveyor portion when the first mentioned conveyor portion is at the lower elevation and providing the conveyor portions with cooperating means whereby when the first mentioned conveyor portion rises from the lower elevation to the higher elevation above mentioned it carries the second mentioned conveyor portion up off of its mounting after the material supporting surface of the first mentioned conveyor portion rises above the level of the material supporting surface of the second mentioned conveyor portion. The mechanism preferably has guide means insuring that when the second mentioned conveyor portion is returned to position on its mounting it will be properly positioned thereon. The second mentioned conveyor portion may have generally downwardly extending guide means and the first mentioned conveyor portion may have cooperating openings or guideways receiving the guide means in guided relationship.

A fixed mounting is provided for the second mentioned conveyor portion. That mounting may comprise fixed mounting members at opposite sides of the first mentioned conveyor portion. Portions of the conveyors may interfit with each other so that whichever of the portions is at the higher elevation will support predeterminedly positioned material. Portions of the conveyors may have rollers rotatable about generally horizontal axes with the axes of the rollers of one of the portions extending at an angle to the axes of the rollers of the other. The rollers preferably interfit so that whichever of the conveyor portions is at the higher elevation will support upon the rollers thereof predeterminedly positioned material. The means for guidedly raising and lowering the first mentioned conveyor portion raises and lowers said conveyor portion relatively to the second mentioned conveyor portion, when the second mentioned conveyor portion is mounted on its fixed mounting, between an elevation at which the upper surfaces of the rollers of the first mentioned conveyor portion are below the level of the upper surfaces of the rollers of the second mentioned conveyor portion and an elevation at which the upper surfaces of the rollers of the first mentioned conveyor portion are above the level of the upper surfaces of the rollers of the second mentioned conveyor portions. Piston and cylinder means may be provided generally beneath the first mentioned conveyor portion for guidedly raising and lowering the same. As the first mentioned conveyor portion moves upwardly it moves by itself until the upper surfaces of its rollers are above the upper surfaces of the rollers of the second mentioned conveyor portion, after which the first mentioned conveyor portion, having taken the material being conveyed from the second mentioned conveyor portion, carries the second mentioned conveyor portion with it during the remainder of the upward movement of the first mentioned conveyor portion. After the first mentioned conveyor portion has taken the material from the second mentioned conveyor portion the second mentioned conveyor portion is no longer operative, but the advantage of carrying the second mentioned conveyor portion upwardly with the first mentioned conveyor portion is that the necessity of providing the first mentioned conveyor portion with undesirably vertically elongated members projecting a relatively great distance upwardly through or alongside the second mentioned conveyor portion to raise the material to a substantial height above the operative position of the second mentioned conveyor portion is obviated.

Other details, objects and advantages of the invention will become apparent as the following description of a present preferred embodiment thereof proceeds.

In the accompanying drawings I have shown a present preferred embodiment of the invention in which Figure 1 is a somewhat diagrammatic view partly in elevation and partly in vertical cross section on the line I—I of Figure 2 of conveying mechanism embodying my invention; and Figure 2 is a somewhat diagrammatic plan view of the conveying mechanism shown in Figure 1, though to somewhat smaller scale.

Referring now more particularly to the drawings, I provide a fixedly mounted vertical cylinder 2 in which operates a piston with which is connected an upwardly projecting supporting member 3 which supports a framework 4 which includes I-beams 16. The framework 4 has opposed upward projections 5 in which are journaled a series of parallel conveying rollers 6. The rollers 6 are of a length spanning the distance between the opposed upward projections 5 and the axes of the rollers 6 are parallel and define a plane perpendicular to the plane of the drawing. Any desired number of rollers 6 may be employed. The rollers 6 are spaced apart, or at least certain of them are spaced apart, to permit other rollers to be positioned therebetween as will be presently described. We find it desirable to group the rollers 6 in groups of two, three, four or five with the groups spaced apart. The rollers 6 may idle, other means being utilized to advance material therealong, or the rollers may be driven, as, for example, by a drive sprocket chain meshing with sprockets 7 of the rollers. The present invention is not concerned with whether the rollers 6 are driven or whether other means are required to advance material over those rollers.

In a preferred structure I employ twenty-three rollers 6 in groups as above defined. Those twenty-three rollers form simply a portion of a conveyor adapted to convey material perpendicular to the plane of the drawing. The portion of the conveyor containing the twenty-three rollers 6 is movable up and down through movement of the piston in the cylinder 2, which movement is controlled by fluid under pressure in a manner well known to those skilled in the art. The portion of the conveyor referred to which I call the first mentioned conveyor portion, normally moves between a lower and an upper position as will presently be described. The lower and upper positions may be defined by the ends of the stroke of the piston in the cylinder 2 or by stop means, not shown.

I provide opposed fixed mounting members or pedestals 8 at opposite sides of the first mentioned conveyor portion as shown in the drawing. Adapted normally to seat upon the pedestals 8 is a framework 9 containing series of rollers 10. The rollers 10 have their axes substantially parallel and horizontal and perpendicular to the plane of the drawing. They are comparatively short rollers and are adapted to be received within the spaces between the rollers or groups of rollers 6 described above. In my preferred structure there are five such spaces so that there are five groups of rollers 10. The rollers 10 may be but a few inches in length and collectively form a roller table as wide as may be desired. The rollers 10 mounted in the framework 9 constitute a portion of a conveyor, which I call the second mentioned conveyor portion, upon which material is adapted to be moved to a predetermined position at which it overlies the rollers 10 and also the rollers 6. The material may, for example, be steel sheets or packs of steel sheets which may be delivered to the conveying mechanism from the right viewing the drawing. The plane formed by the upper surfaces of the rollers 10 slopes slightly downwardly from right to left viewing the drawing and material started thereover will continue to move by gravity, the rollers 10 being turned by the material. I provide a stop 11 forming a part of the conveyor which includes the rollers 10, and the stop may be adjustably positioned to stop the material so that it is substantially centered over the cylinder 2.

The second mentioned conveyor portion normally rests on the pedestals 8. Connected with and extending downwardly from the second mentioned conveyor portion are guide pins 12 each of which is guidingly received in an opening 13 in a plate 14 forming the upper portion of a bracket 15 constituting a portion of the framework 4.

Material delivered from right to left on the rollers 10 is adapted to be transferred from the rollers 10 to the rollers 6, raised to a substantially higher elevation and by the rollers 6 delivered in a direction perpendicular to the plane of the drawing. Material may move onto the rollers 10 as above described until the forward edge thereof engages the stop 11. At that time the upper surfaces of the rollers 6 are at a level below the upper surfaces of the rollers 10. The piston in the cylinder 2 may then be moved upwardly which raises the framework 4 carrying the rollers 6. The rollers 6 move upwardly until their upper surfaces rise to a level above the upper surfaces of the rollers 10 whereupon the rollers 6 take the material from the rollers 10. As the rollers 6 continue their upward movement the upper flanges of the I-beams 16 forming portions of the framework 4 engage the under surface of the framework 9 and carry the same with the framework 4 in any desired further upward movement. Thus the material may be raised to any height to which the piston in the cylinder 2 is capable of raising it but without the necessity of providing the framework 4 with undesirably vertically elongated members projecting up between or alongside the rollers 10 to support the rollers 6 in their movement upwardly beyond the rollers 10. That difficulty is obviated by carrying the framework 9 along with the framework 4 after the upper surfaces of the rollers 6 have risen to a level above the upper surfaces of the rollers 10. After the material has been thus raised by raising of the rollers 6 it may be delivered in a plane perpendicular to the plane of the drawing either by driving the rollers 6 or by pushing the material therealong.

While I have shown and described a present preferred embodiment of the invention it is to be distinctly understood that the invention is not limited thereto but may be otherwise variously embodied within the scope of the following claims.

I claim:

1. Conveying mechanism comprising a stationarily mounted upright cylinder, a piston operable in the cylinder, two conveyors adapted to support material being advanced and to transfer the material from one of the conveyors to the other, at least a portion of one of the conveyors being mounted on the piston for guided movement between an elevation at which its material supporting surface is below the level of the material supporting surface of the adjacent portion of the other conveyor and an elevation at which its material supporting surface is above the level of the material supporting surface of said portion of the other conveyor to effect transfer of the material from one of the conveyors to the other, said portion of the second mentioned conveyor being mounted independently of said portion of the first mentioned conveyor when said portion of the first mentioned conveyor is at the first mentioned elevation, said portions of the conveyors having generally vertically aligned cooperating means engageable with each other when said portion of the first mentioned conveyor rises from the first mentioned elevation to the second mentioned elevation to cause the first mentioned conveyor to carry said portion of the second mentioned conveyor up off of its mounting after the material supporting surface of said portion of the first mentioned conveyor rises above the level of the material supporting surface of said portion of the second mentioned conveyor.

2. Conveying mechanism comprising two conveyors adapted to support material being advanced and to transfer the material from one of the conveyors to the other, at least a portion of one of the conveyors being mounted for guided movement between an elevation at which its material supporting surface is below the level of the material supporting surface of the adjacent portion of the other conveyor and an elevation at which its material supporting surface is above the level of the material supporting surface of said portion of the other conveyor to effect transfer of the material from one of the conveyors to the other, mounting means upon which said portion of the second mentioned conveyor is mounted independently of said portion of the first mentioned conveyor when said portion of the first mentioned conveyor is at the first mentioned elevation, said portions of the conveyors having cooperating means whereby when said portion of the first mentioned conveyor rises from the first mentioned elevation to the second mentioned elevation it carries said portion of the second mentioned conveyor up off of its mounting after the material supporting surface of said portion of the first mentioned conveyor rises above the level of the material supporting surface of said portion of the second mentioned conveyor, said portion of the second mentioned conveyor having generally downwardly extending guide pins separate from the mounting means and said portion of the first mentioned conveyor having cooperating openings receiving the guide pins in guided relationship to insure that when said portion of the second mentioned conveyor is returned to position on its mounting it will be properly positioned thereon.

3. Conveying mechanism comprising two conveyors adapted to support material being advanced and to transfer the material from one of the conveyors to the other, means for guidedly raising and lowering a portion of one of the conveyors, a fixed mounting comprising upwardly extending pedestal means for a portion of the other conveyor, said means raising and lowering said portion of the first mentioned conveyor relatively to said portion of the second mentioned conveyor, when said portion of the second mentioned conveyor is mounted on its fixed mounting, between an elevation at which the material supporting surface of said portion of the first mentioned conveyor is below the level of the material supporting surface of said portion of the second mentioned conveyor and an elevation at which the material supporting surface of said portion of the first mentioned conveyor is above the level of the material supporting surface of said portion of the second mentioned conveyor, said portions of the conveyors having generally vertically aligned cooperating means engageable with each other when said portion of the first mentioned conveyor rises from the first mentioned elevation to the second mentioned elevation to cause the first mentioned conveyor to carry said portion of the second mentioned conveyor up off of its fixed mounting after the material supporting surface of said portion of the first mentioned conveyor rises above the level of the material supporting surface of said portion of the second mentioned conveyor.

4. Conveying mechanism comprising two conveyors adapted to support material being advanced and to transfer the material from one of the conveyors to the other, means for guidedly raising and lowering a portion of one of the conveyors, fixed upwardly projecting mounting members for a portion of the other conveyor at opposite sides of said portion of the first mentioned conveyor, said means raising and lowering said portion of the first mentioned conveyor relatively to said portion of the second mentioned conveyor, when said portion of the second mentioned conveyor is mounted on its fixed mounting members, between an elevation at which the material supporting surface of said portion of the first mentioned conveyor is below the level of the material supporting surface of said portion of the second mentioned conveyor and an elevation at which the material supporting surface of said portion of the first mentioned conveyor is above the level of the material supporting surface of said portion of the second mentioned conveyor, said portions of the conveyors having generally vertically aligned cooperating means engageable with each other when said portion of the first mentioned conveyor rises from the first mentioned elevation to the second mentioned elevation to cause the first mentioned conveyor to carry said portion of the second mentioned conveyor up off of its fixed mounting members after the material supporting surface of said portion of the first mentioned conveyor rises above the level of the material supporting surface of said portion of the second mentioned conveyor.

5. Conveying mechanism comprising two conveyors adapted to support material being advanced and to transfer the material from one of the conveyors to the other, portions of the conveyors having rollers rotatable about generally horizontal axes with the axes of the rollers of one of such portions extending at an angle to the axes of the rollers of the other of such portions, the rollers interfitting so that whichever of such portions is at the higher elevation will support upon the rollers thereof predeterminedly positioned material, means for guidedly raising and lowering said portion of one of the conveyors, a fixed mounting comprising upwardly extending pedestal means for said portion of the other conveyor, said means raising and lowering said portion of the first mentioned conveyor relatively to said portion of the second mentioned conveyor, when said portion of the second mentioned conveyor is mounted on its fixed mounting, between an elevation at which the upper surfaces of the rollers of said portion of the first mentioned conveyor are below the level of the upper surfaces of the rollers of said portion of the second mentioned conveyor and an elevation at which the upper surfaces of the rollers of said portion of the first mentioned conveyor are above the level of the upper surfaces of the rollers of said portion of the second mentioned conveyor, said portions of the conveyors having generally vertically aligned cooperating means engageable with each other when said portion of the first mentioned conveyor rises from the first mentioned elevation to the second mentioned elevation to cause the first mentioned conveyor to carry said portion of the second mentioned conveyor up off of its fixed mounting after the upper surfaces of the rollers of said portion of the first mentioned conveyor rise above the level of the upper surfaces of the rollers of said portion of the second mentioned conveyor.

6. Conveying mechanism comprising two conveyors adapted to support material being advanced and to transfer the material from one of the conveyors to the other, portions of the conveyors having rollers rotatable about generally horizontal axes with the axes of the rollers of one of such portions extending at an angle to the axes of the rollers of the other of such portions, the rollers interfitting so that whichever of such portions is at the higher elevation will support upon the rollers thereof predeterminedly positioned material, generally vertically arranged piston and cylinder means generally beneath said portion of one of the conveyors for guidedly raising and lowering the same, fixed mounting members for said portion of the other conveyor at opposite sides of said portion of the first mentioned conveyor, said means raising and lowering said portion of the first mentioned conveyor relatively to said portion of the second mentioned conveyor, when said portion of the second mentioned conveyor is mounted on its fixed mounting members, between an elevation at which the upper surfaces of the rollers of said portion of the first mentioned conveyor are below the level of the upper surfaces of the rollers of said portion of the second mentioned conveyor and an elevation at which the upper surfaces of the rollers of said portion of the first mentioned conveyor are above the level of the upper surfaces of the rollers of said portion of the second mentioned conveyor, said portions of the conveyors having generally vertically aligned cooperating means engageable with each other when said portion of the first mentioned conveyor rises from the first mentioned elevation to the second mentioned elevation to cause the first mentioned conveyor to carry said portion of the second mentioned conveyor up off of its fixed mounting members after the upper surfaces of the rollers of said portion of the first mentioned conveyor rise above the level of the upper surfaces of the rollers of said portion of the second mentioned conveyor, the mechanism having guide means insuring that when said portion of the second mentioned conveyor is returned to position on its fixed mounting members it will be properly positioned thereon.

References Cited in the file of this patent

UNITED STATES PATENTS

| | | |
|---|---|---|
| 1,349,450 | French et al. | Aug. 10, 1920 |
| 1,776,201 | St. Clair et al. | Sept. 16, 1930 |
| 1,998,968 | Rosin | Apr. 23, 1935 |
| 2,360,661 | Eddy | Oct. 17, 1944 |

UNITED STATES PATENT OFFICE
CERTIFICATE OF CORRECTION

Patent No. 2,848,095                      August 19, 1958

David E. Dolle

It is hereby certified that error appears in the printed specification of the above numbered patent requiring correction and that the said Letters Patent should read as corrected below.

Column 1, line 32, for "substantially" read -- substantial --; line 34, for "undersirably" read -- undesirably --; column 5, line 12, for "vertlcally" read -- vertically --.

Signed and sealed this 16th day of December 1958.

(SEAL)
Attest:

KARL H. AXLINE
Attesting Officer

ROBERT C. WATSON
Commissioner of Patents